Nov. 21, 1950 R. R. WISNER 2,531,183
MEANS FOR GROUNDING CABLES
Filed Jan. 23, 1945
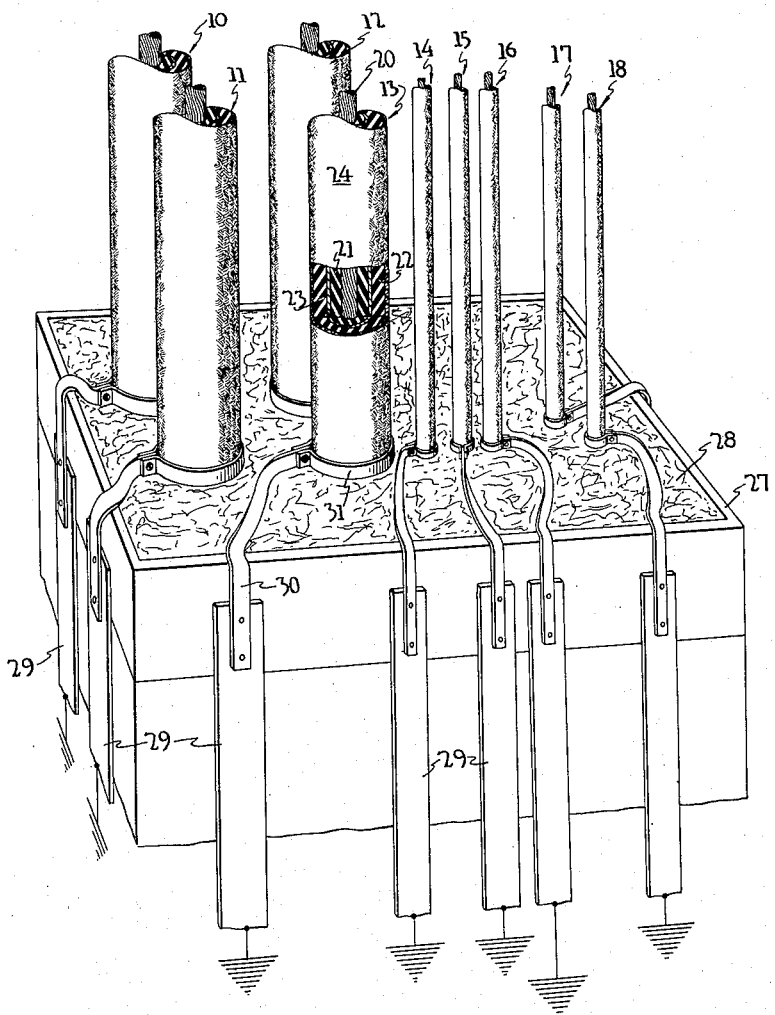
INVENTOR.
Raymond R. Wisner
BY
Robert A. Lavender Patented Nov. 21, 1950

2,531,183

UNITED STATES PATENT OFFICE 2,531,183

MEANS FOR GROUNDING CABLES

Raymond R. Wisner, Oak Ridge, Tenn., assignor, by mesne assignments, to the United States of America as represented by the United States Atomic Energy Commission Application January 23, 1945, Serial No. 574,155

8 Claims. (Cl. 174—6)

This invention is concerned with improved means for grounding electrical cables which are equipped with conductive sheaths or sleeves on the outside of their insulation for the purpose of distributing any static charge and enabling the charge to be carried off to ground.

An object of my invention is to provide improved means for grounding the cable sheaths so as to permit any static charge to leak off to ground with the maximum of ease or freedom so as to thereby obviate the possibility of an arc discharge occurring between cables and ground.

A further object of my invention and various of its advantages will become apparent from the following detailed description and annexed drawing wherein the single figure is a perspective view of a number of cables employing conductive sheaths and having the grounding means of my invention associated therewith.

Referring to the drawing, there are shown a number of cables, there being four large cables 10, 11, 12 and 13 and a number of smaller cables 14, 15, 16, 17 and 18. In this instance all of the cables are substantially parallel and the grounding means of my invention is associated with all of them as will presently be described. All of the cables are insulated and the insulation is covered with a conductive sheath for a considerable distance along the cable adjacent the point where the sheath is connected to ground. Thus, with reference to the cable 13, the cable comprises a central or internal copper conductor 20 which is covered by a first layer of insulation 21 and this layer of insulation has between it and the second layer of insulation 22 a conductive layer or sheath 23 which in this particular cable is described as a high voltage sheath, its purpose being to conduct a flow of current which is at a relatively high voltage, that is, considerably higher than the voltage of the current which is carried by the conductor 20. The sheath 24 covers the cable, that is, the outside of the cable around the second layer of insulation 22. The sheath 24 which is grounded may preferably be made of interlaced or interwoven copper braid material which is highly conductive so that any static charge on the outside of the cable may be distributed over a considerable area to thus reduce the possibility of there being an arc discharge between the cable and any other point which might produce harmful results such as damaging the cable insulation. The sheaths or sleeves thus form grounded shields for the cables.

Numeral 27 designates a generally rectangular copper frame through which all of the cables pass substantially at right angles and the interior of the frame 27 is packed with a material 28 which may preferably be a copper wool blanket material which can be conveniently packed in the frame 27 so as to be in intimate electrical contact with the sheaths of all of the cables and all around each of them. The material 28 therefore provides paths for any charge on the sheaths on the cables to leak off to ground with the maximum of freedom, the frame 27 being grounded at a plurality of points by means of copper strips 29 which are riveted to the sides of the frame 27 and which are connected to ground. To provide additional freedom for any charge on the cable sheaths to pass off to ground the sheaths of each of the cables are connected to one of the strips 29 by a copper strap such as the strap 30 which connects to the sheath 24 of cable 13, the copper strap 30 being riveted to a strap 31 which is tightly wrapped around the sheath 24 of cable 13 and riveted to the strap 30. The sheaths of the other cables are similarly connected to one of the strips 29 as shown.

From the foregoing it is to be seen that my invention provides a maximum in security in the way of providing freedom for any charge on the cable sheaths to pass off to ground. The invention may conveniently be practiced whether there is only a single cable or whether there are a plurality of cables adjacent each other as shown on the drawing.

The disclosure herein is representative of the preferred form of my invention and it is intended that the disclosure be interpreted in an illustrative rather than a limiting sense, the scope of the invention to be determined only in accordance with the claims appended hereto.

I claim:

1. A device for grounding the shield of a shielded electric cable comprising an electrically conductive frame, said frame being grounded at a plurality of points and having a mass of electrically conductive filamentous material packed as a blanket therewithin and around said cable in intimate electrical contact with the shield whereby a plurality of ground paths from the shield to ground are formed by the material and the frame, said blanket of filamentous material extending for a considerable distance lengthwise of said shielded cable and filling the entire space between said cable and said grounded frame.

2. A device for grounding the shield of a shielded electric cable comprising an electrically conductive frame, said frame being grounded at a plurality of points and having a mass of electrically conductive filamentous material packed as a blanket therewithin and around said cable in intimate electrical contact with the shield whereby a plurality of ground paths from the shield to ground are formed by the material and the frame and means forming an additional ground path comprising an electrically conductive member connected to said shield and to said frame and said frame being connected to ground at the point where said member connects to it.

3. A device for grounding the shield of a shielded electric cable comprising an electrically conductive frame, said frame being grounded at a plurality of points and having a copper wool blanket material packed therewithin and around said cable in intimate electrical contact with the shield whereby a plurality of ground paths from the shield are formed by the material and frame, and means forming an additional ground path comprising an electrically conducting member connected to said shield at one end and to said frame at the other end.

4. A device for grounding the shields of a plurality of adjacent shielded electric cables comprising an electrically conductive frame, said frame being grounded at a plurality of points and having a mass of electrically conductive filamentous material packed as a blanket therewithin and around said cables in intimate electrical contact with the shields whereby a plurality of ground paths from the shields to ground are formed by the material and the frame, said blanket of filamentous material extending for a considerable distance lengthwise of said shielded cables and filling the entire space between said cables and said ground frame.

5. A device for grounding the shields of a plurality of adjacent shielded electric cables comprising an electrically conductive frame, said frame being grounded at a plurality of points and having a copper wool blanket material packed therewithin and around said cables in intimate electrical contact with said shields whereby a plurality of ground paths from the shields to ground are formed by the material and the frame, and means forming additional ground paths comprising a plurality of electrically conductive straps respectively connected at one end to the respective cables and at the other end to said frame.

6. A device for grounding the shield of a shielded electric cable comprising an electrically conductive frame, said frame being grounded at a plurality of points and having copper wool blanket material packed therewithin and around said cable in intimate electrical contact with said shield whereby a plurality of ground paths from the shield to ground are formed by the material and the frame and means forming an additional ground path comprising an electrically conductive member connected to said shield and to said frame and said frame being connected to ground at the point where said member connects to it.

7. A device for grounding the shields of a plurality of adjacent shielded electric cables comprising an electrically conductive frame, said frame being grounded at a plurality of points and having a mass of electrically conductive filamentous material packed as a blanket therewithin and around said cables in intimate electrical contact with said shields whereby a plurality of ground paths from the shields to ground are formed by the material and the frame and means forming an additional ground path from a plurality of said shields to ground comprising a plurality of electrically conductive members, one connected to each of said shields and to said frame and said frame being connected to ground at the points where said members connect to it.

8. A device for grounding the shields of a plurality of adjacent shielded electric cables comprising an electrically conductive frame, said frame being grounded at a plurality of points and having a copper wool blanket material packed therewithin and around said cables in intimate electrical contact with said shields whereby a plurality of ground paths from each of the said shields to ground are formed by the material and the frame and means forming an additional ground path from each of the shields to ground comprising a plurality of electrically conductive members one connected to each of said shields and to said frame and said frame being connected to ground at the points where said members connect to it.

RAYMOND R. WISNER.

REFERENCES CITED

The following references are of record in the file of this patent:

UNITED STATES PATENTS

| Number | Name | Date |
|---|---|---|
| 224,579 | Chinnock | Feb. 17, 1880 |
| 231,085 | Pearson | Aug. 10, 1880 |
| 1,288,303 | Vogel | Dec. 17, 1918 |
| 1,608,184 | Rumble | Nov. 23, 1926 |
| 1,743,888 | Harnister | Jan. 14, 1930 |
| 1,927,045 | Parsons | Sept. 19, 1933 |
| 2,293,839 | Linder | Aug. 25, 1942 |
| 2,417,260 | Moorehouse | Mar. 11, 1947 |

FOREIGN PATENTS

| Number | Country | Date |
|---|---|---|
| 10,406 | England | 1907 |
| 28,623 | England | 1903 |
| 339,413 | France | Apr. 18, 1904 |
| 731,930 | France | June 6, 1932 |